A. WARREN, Dec'd.

Assignor to G. FROST, G. H. PHELPS, G. A. FROST & G. A. WARREN.

STOCKING AND SKIRT HOLDER.

No. 10,898. Reissued Feb. 7, 1888.

Witnesses
J. H. Shumway
Fred C. Earle

Geo. Frost, Geo. H. Phelps, Geo. A. Frost
& Georgia A. Warren
assignees of Andrew Warren (Deceased)
Inventor
By Atty.
Wm. C. Earle N. PETERS, Photo-Lithographer, Washington, D. C.

UNITED STATES PATENT OFFICE.

GEORGE FROST, GEORGE H. PHELPS, AND GEORGE A. FROST, OF NEWTON, AND GEORGIA A. WARREN, OF WALTHAM, MASSACHUSETTS, ASSIGNEES OF ANDREW WARREN, DECEASED.

STOCKING AND SKIRT HOLDER.

SPECIFICATION forming part of Reissued Letters Patent No. 10,898, dated February 7, 1888.

Original No. 159,291, dated February 2, 1875. Reissue No. 7,347, dated October 10, 1876. Application for present reissue filed December 23, 1887. Serial No: 258,828.

*To all whom it may concern:*

Be it known that ANDREW WARREN, (now deceased,) of Waltham, county of Middlesex, State of Massachusetts, did invent an Improved Stocking and Skirt Holder, of which the following is a specification.

Figure 1:
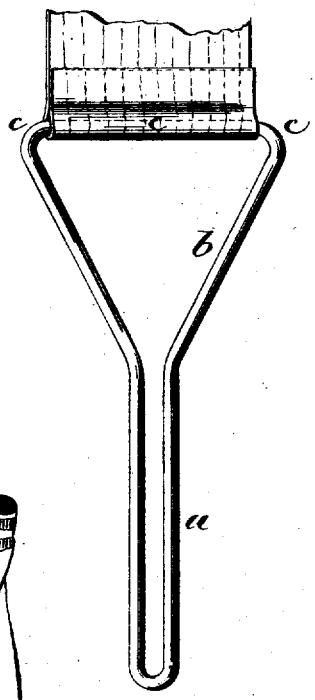
Figure 2:
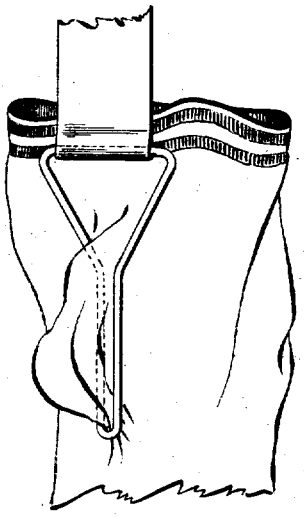
Figure 3:
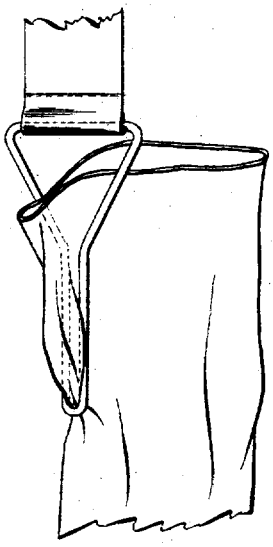

The object of this invention is to produce a stocking and skirt holder of a most simple form and at very small cost, which can be attached and detached quickly and with great convenience without requiring shifting of other parts to secure and release the hold, as in the clamp with sliding band over it, or working a tongue and catch, as in other skirt-holders in use; and the invention consists in bending a wire in such a manner as to form the clasp *a*, the loop *b*, and the hook *c*, attached to a strap, all in one, as shown in the accompanying drawings, Figure 1; and this is accomplished by doubling a suitable wire in the middle of its length in such a manner as to form a narrow space for a certain length, which constitutes the clasp *a*, then bending the two sides of the clasp outward, so as to gradually widen the space so formed to the width of the strap, then returning and uniting the two ends of the wire in a right-angular direction to the longest dimensions of the clasp. By attaching the thus-united ends or hooks to a suitable strap the holder is made ready for use.

In applying this holder a small portion of the stocking or skirt, either at the edge or any other convenient place, may be drawn into the enlarged opening or loop *b* of the holder and then pushed downward into the narrow space or clasp *a*, where it is compressed and firmly held; or, in disengaging, the garment is pulled from the compressing-clasp *a* into the loop *b*, thus freeing it from the holder.

The whole operation of attaching and detaching the holder to and from the garment is extremely simple, and the parts not liable to get out of order or to tear the garment.

The holder may be manufactured in other ways, as above indicated, as it may be stamped out of a plate of steel or other suitable material.

This invention is not confined to the exact form as shown, as this may be more or less modified; but

What is claimed as the invention of ANDREW WARREN is—

A stocking and skirt holder made in one piece and comprising the clasp *a*, which, by compression alone, holds the garment, the loop *b*, and the bends *c c*.

GEO. FROST,
GEO. H. PHELPS,
GEO. A. FROST,
GEORGIA A. WARREN,
*Assignees of Andrew Warren, deceased.*

Witnesses:
J. KINSLEY,
E. F. BISBEE.